(12) United States Patent
Lukman et al.

(10) Patent No.: US 10,599,552 B2
(45) Date of Patent: Mar. 24, 2020

(54) MODEL CHECKER FOR FINDING DISTRIBUTED CONCURRENCY BUGS

(71) Applicants: Futurewei Technologies, Inc., Plano, TX (US); University of Chicago, Chicago, IL (US)

(72) Inventors: Jeffrey Lukman, Chicago, IL (US); Huan Ke, Chicago, IL (US); Haryadi Gunawi, Chicago, IL (US); Feng Ye, Mississauga (CA); Chen Tian, Union City, CA (US); Shen Chi Chen, San Jose, CA (US)

( * ) Notice: Subject to any disclaimer, the term of this patent is extended or adjusted under 35 U.S.C. 154(b) by 0 days.

(21) Appl. No.: 15/962,873

(22) Filed: Apr. 25, 2018

(65) Prior Publication Data

US 2019/0332518 A1  Oct. 31, 2019

(51) Int. Cl.
G06F 11/36 (2006.01)
(52) U.S. Cl.
CPC ...... G06F 11/3632 (2013.01); G06F 11/3688 (2013.01); G06F 11/3692 (2013.01)
(58) Field of Classification Search
CPC .. G06F 11/36; G06F 11/3632; G06F 11/3688; G06F 11/3692
See application file for complete search history.

(56) References Cited

U.S. PATENT DOCUMENTS

| | | | |
|---|---|---|---|
| 6,009,269 A * | 12/1999 | Burrows | G06F 9/524 714/38.1 |
| 7,797,669 B1 * | 9/2010 | Rehof | G06F 11/3668 717/100 |
| 7,917,909 B2 * | 3/2011 | Stall | G06F 11/3632 718/106 |
| 8,510,304 B1 | 8/2013 | Briggs et al. | |
| 8,862,942 B2 | 10/2014 | Jalbert et al. | |
| 8,966,453 B1 | 2/2015 | Zamfir et al. | |

(Continued)

FOREIGN PATENT DOCUMENTS

| CN | 103645961 A | 3/2014 |
|---|---|---|
| WO | 2004025514 A2 | 3/2004 |

OTHER PUBLICATIONS

"An Effect-Oriented Approach to Concurrency-Bug Detection and Recovery," CERES—Center for Unstoppable Computing, The University of Chicago, 2017, 77 pages.

(Continued)

*Primary Examiner* — Ziaul A Chowdhury
(74) *Attorney, Agent, or Firm* — Conley Rose, P.C.

(57) ABSTRACT

Described herein are systems and methods for distributed concurrency (DC) bug detection. The method includes identifying a plurality of nodes in a distributed computing cluster; identifying a plurality of messages to be transmitted during execution of an application by the distributed computing cluster; determining a set of orderings of the plurality of messages for DC bug detection, the set of orderings determined based upon the plurality of nodes and the plurality of messages; removing a subset of the orderings from the set of orderings based upon one or more of a state symmetry algorithm, a disjoint-update independence algorithm, or a zero-crash-impact reordering algorithm; and performing DC bug detection testing using the set of orderings after the subset of the orderings is removed from the set of orderings.

21 Claims, 4 Drawing Sheets

(56) References Cited

U.S. PATENT DOCUMENTS

| | | | | |
|---|---|---|---|---|
| 9,032,259 | B1* | 5/2015 | Hood | G06F 11/3692 |
| | | | | 714/57 |
| 9,176,834 | B2 | 11/2015 | Griffith et al. | |
| 9,235,497 | B2 | 1/2016 | Ma | |
| 9,501,340 | B2 | 11/2016 | Dautenhahn et al. | |
| 9,720,753 | B2 | 8/2017 | Joshi et al. | |
| 2008/0271042 | A1* | 10/2008 | Musuvathi | G06F 11/3688 |
| | | | | 718/108 |
| 2009/0235262 | A1* | 9/2009 | Ceze | G06F 9/52 |
| | | | | 718/102 |
| 2010/0107017 | A1 | 4/2010 | Munjal et al. | |
| 2010/0125758 | A1 | 5/2010 | Yang et al. | |
| 2010/0169888 | A1 | 7/2010 | Hare et al. | |
| 2011/0093745 | A1 | 4/2011 | Zlotnick et al. | |
| 2011/0131550 | A1 | 6/2011 | Burckhardt et al. | |
| 2011/0219208 | A1 | 9/2011 | Asaad et al. | |
| 2012/0102470 | A1* | 4/2012 | Yang | G06F 11/3632 |
| | | | | 717/130 |
| 2012/0124431 | A1 | 5/2012 | Bauer et al. | |
| 2012/0144372 | A1* | 6/2012 | Ceze | G06F 8/314 |
| | | | | 717/124 |
| 2012/0151271 | A1 | 6/2012 | Ganai | |
| 2012/0167162 | A1 | 6/2012 | Raleigh et al. | |
| 2012/0174074 | A1 | 7/2012 | Ganai | |
| 2012/0278658 | A1 | 11/2012 | Han et al. | |
| 2012/0278660 | A1* | 11/2012 | Mangold | G06F 11/3688 |
| | | | | 714/38.1 |
| 2013/0232118 | A1 | 9/2013 | Reid et al. | |
| 2013/0297978 | A1* | 11/2013 | Jalbert | G06F 11/3632 |
| | | | | 714/49 |
| 2014/0007054 | A1* | 1/2014 | Wu | G06F 11/36 |
| | | | | 717/124 |
| 2014/0033174 | A1 | 1/2014 | Farchi et al. | |
| 2014/0380101 | A1 | 12/2014 | Yu | |
| 2015/0019901 | A1 | 1/2015 | Gounares et al. | |
| 2015/0081243 | A1* | 3/2015 | Ganai | G06F 11/3688 |
| | | | | 702/123 |
| 2015/0134795 | A1 | 5/2015 | Theimer et al. | |
| 2015/0161030 | A1 | 6/2015 | Wu et al. | |
| 2016/0224447 | A1* | 8/2016 | Nakao | G06F 11/008 |
| 2016/0283345 | A1 | 9/2016 | Gounares et al. | |
| 2016/0306922 | A1 | 10/2016 | van Rooyen et al. | |
| 2016/0364315 | A1 | 12/2016 | Lee et al. | |
| 2017/0039371 | A1 | 2/2017 | Lukacs et al. | |
| 2017/0123929 | A1* | 5/2017 | Helleren | G06F 11/1441 |
| 2017/0161073 | A1* | 6/2017 | Chen | G06F 11/3632 |
| 2017/0177737 | A9 | 6/2017 | Hu et al. | |
| 2017/0193012 | A1 | 7/2017 | Gupta et al. | |
| 2017/0242414 | A1 | 8/2017 | Coote | |
| 2018/0046565 | A1* | 2/2018 | Lu | G06F 11/3632 |

OTHER PUBLICATIONS

Leesatapornwongsa, et al., "TaxDC: A Taxonomy of Non-Deterministic Concurrency Bugs in Datacenter Distributed Systems," Proceedings of the 21th ACM International Conference on Architectural Support for Programming Languages andOperating Systems (ASPLOS '16), 2016, 14 pages.

Burckhardt, et al., "A Randomized Scheduler with Probabilistic Guarantees of Finding Bugs," ASPLOS'10, Mar. 13-17, 2010, Pittsburgh, Pennsylvania, USA., 12 pages.

Flanagan, et al., "Dynamic Partial-Order Reduction for Model Checking Software," POPL'05, Jan. 12-14, 2005, Long Beach, California, USA, pp. 1-12.

"Exploring the Challenges and Opportunities of Cloud Stacks in Dynamic Resource Environments," IEEE Computer Society, Feb. 8, 2018, 3 pages.

Leesatapornwongsa, et al., "Scalability Bugs: When 100-Node Testing is Not Enough," HotOS '17, May 8-10, 2017, Whistler, BC, Canada, 6 pages.

Deligiannis, et al. "Uncovering Bugs in Distributed Storage Systems during Testing (Not in Production!)," Proceedings of the 14th Usenix Conference on File and Storage Technologies (FAST '16), Feb. 22-25, 2016, Santa Clara, CA, USA, 15 pages.

Leesatapornwongsa, et al., "SAMC: Semantic-Aware Model Checking for Fast Discovery of Deep Bugs in Cloud Systems," Proceedings of the 11th Usenix Symposium on Operating Systems Design and Implementation (OSDI '14), 2014, pp. 1-16.

Kasikci, et al., "Lazy Diagnosis of In-Production Concurrency Bugs," SOSP '17, Oct. 28, 2017, Shanghai, China, 17 pages.

Gunawi, et al., "Why Does the Cloud Stop Computing? Lessons from Hundreds of Service Outages," SoCC '16, Oct. 5-7, 2016, Santa Clara, CA, USA., 16 pages.

"Understanding cloud computing," Redhat, https://www.redhat.com/en/topics/cloud, downloaded from the Internet Feb. 2, 2018, pp. 1-13.

Farchi,et al., "Concurrent Bug Patterns and How to Test Them," IEEE, 2003, 7 pages.

Wuhib, et al., "Dynamic Resource Allocation with Management Objectives—Implementation for an OpenStack Cloud," 8th International Conference on Network and Service Management (CNSM 2012): Mini-Conference, 2012, pp. 309-315.

Machine Translation and Abstract of Chinese Publication No. CN103645961, Mar. 19, 2014, 9 pages.

Foreign Communication From A Counterpart Application, International Application No. PCT/CN2017/096505, International Search Report dated Nov. 8, 2017, 3 pages.

Office Action dated Aug. 9, 2018, 42 pages, U.S. Appl. No. 15/668,469, filed Aug. 3, 2017.

Office Action dated Feb. 26, 2019, 43 pages, U.S. Appl. No. 15/668,469, filed Aug. 3, 2017.

Bertot, Y., et al., "Interactive Theorem Proving and Program Development," Coq'Art: The Calculus of Inductive Constructions, ISBN:3540208542, 2004, 508 pages.

Lamport, L., "Specifying Systems: The TLA+ Language and Tools for Hardware and Software Engineers," ISBN:032114306X, 2002, 381 pages.

Deng, D., et al., "Fixing, preventing, and recovering from concurrency bugs," Review, Soecial Focus on High-Cinfidence Software Technologies, col. 58, May 2015, 18 pages.

Alagappan, R., et al., "Correlated Crash Vulnerabilities," Usenix Symposium on Operating Systems Design and Implementation, Nov. 2-4, 2016, pp. 151-167.

Alvaro, P., et al., "Automating Failure Testing Research at Internet Scale," SoCC '16 Proceedings of the Seventh ACM Symposium on Cloud Computing, Oct. 5-7, 2016, 12 pages.

Alvaro, P., "Lineage-driven Fault Interjection," SIGMOD, May 31-Jun. 4, 2015, 16 pages.

Bhandari, K., et al., "Makalu: Fast Recoverable Allocation of Non-volatile Memory," Proceedings of the 2016 ACM SIGPLAN International Conference on Object-Oriented Programming, Systems, Languages, and Applications, Nov. 2-4, 2016, 18 pages.

Brutschy, L., et al., "Serializability for Eventual Consistency: Criterion, Analysis, and Applications," Proceedings of the 44th ACM SIGPLAN Symposium on Principles of Programming Languages, Jan. 15-21, 2017, 15 pages.

Chen, F., et al., "jPredictor: A Predictive Runtime Analysis Tool for Java," ACM/IEEE 30th International Conference on Software Engineering, May 10-18, 2008, pp. 221-230.

Datapath.io, "Recent AWS outage and how you could have avoided downtime," Mar. 9, 2017, 6 pages.

Dean, J., "Designs, Lessons and Advice from Building Large Distributed Systems," Google, Keynote from LADIS, 2009, 73 pages.

Deligiannis, P., et al., "Asynchronous Programming, Analysis and Testing with State Machines," Proceedings of the 36th ACM SIGPLAN Conference on Programming Language Design and Implementation, Jun. 13-17, 2015, 11 pages.

Ganesan, A., et al., "Redundancy Does Not Imply Fault Tolerance: Analysis of Distributed Storage Reactions to Single Errors and Corruptions," Proceedings of the 15th Usenix Conference on File and Storage Technologies, Feb. 27-Mar. 2, 2017, pp. 149-165.

(56) References Cited

OTHER PUBLICATIONS

Gunawi, H., et al., "Fate and Destini: A Framework for Cloud Recovery Testing," Proceedings of the 8th Usenix Symposium on Networked Systems Design and Implementation, Mar. 2011, 14 pages.

Gunawi, H., et al., "EIO: Error Handling is Occasionally Correct," 6th Usenix Conference on File and Storage Technologies, Dec. 2008, pp. 207-222.

Guo, H., et al., "Practical Software Model Checking via Dynamic Interface Reduction," Proceedings of the Twenty-Third ACM Symposium on Operating Systems Principles, Oct. 23-26, 2011, 14 pages.

Guo, Z., et al., "Failure Recovery: When the Cure Is Worse Than the Disease," Proceedings of the 14th Usenix conference on Hot Topics in Operating Systems, May 2013, 6 pages.

Hawblitzel, C., et al., "IronFleet: Proving Practical Distributed Systems Correct," Proceedings of the ACM Symposium on Operating Systems Principles, Oct. 4-7, 2015, 17 pages.

Huang, R., et al., "Non-Race Concurrency Bug Detection Through Order-Sensitive Critical Sections," Proceedings of the 40th Annual International Symposium on Computer Architecture, Jun. 23-27, 2013, 12 pages.

"WalaWiki," http://wala.sourceforge.net/wiki/index.php/Main_page, Mar. 5, 2018, 2 pages.

"Javassist," http://jboss-javassist.github.io/javassist, Mar. 5, 2018, 2 pages.

Joshi, P., et al., "Setsudo: Perturbation-based Testing Framework for Scalable Distributed Systems," Proceeding of the Conference on Timely Results in Operating Systems, Nov. 3, 2013, 14 pages.

Killian, C., et al., "Life, Death, and the Critical Transition: Finding Liveness Bugs in Systems Code," Proceedings of the 4th Usenix conference on Networked Systems Design & Implementation, Apr. 11-13, 2007, pp. 243-256.

Kolli, A., et al., "High-Performance Transactions for Persistent Memories," High-Performance Transactions for Persistent Memories, Apr. 2-6, 2016, 13 pages.

Koskinen, E., et al., "Reducing Crash Recoverability to Reachability," Proceedings of the 43rd Annual ACM SIGPLAN-SIGACT Symposium on Principles of Programming Languages, Jan. 20-22, 2016, pp. 97-108.

Laadan, O., et al., "Pervasive Detection of Process Races in Deployed Systems," Proceedings of the Twenty-Third ACM Symposium on Operating Systems Principles, Oct. 23-26, 2011, pp. 353-367.

Lamport, L., "Time, Clocks, and the Ordering of Events in a Distributed Systems," Communications of the ACM, vol. 21, No. 7, Jul. 1978, pp. 558-565.

Lantz P., et al., "Yat: A Validation Framework for Persistent Memory Software," Proceedings of Usenix ATC '14: 2014 Usenix Annual Technical Conference, Jun. 19-20, 2014, 7 pages.

Leesatapornwongsa, T., et al., "TaxDC: A Taxonomy of Non-Deterministic Concurrency Bugs in Datacenter Distributed System," Proceedings of the 21th ACM International Conference on Architectural Support for Programming Languages and Operating Systems, Apr. 2-6, 2016, 14 pages.

Li K., et al., "ReproLite: A Lightweight Tool to Quickly Reproduce Hard System Bugs," Proceedings of the ACM Symposium on Cloud Computing, Nov. 3-5, 2014, 13 pages.

Liu, H., "DCatch: Automatically Detecting Distributed Concurrency Bugs in Cloud Systems," Proceedings of the Twenty-Second International Conference on Architectural Support for Programming Languages and Operating Systems, Apr. 8-12, 2017, 15 pages.

"Businesses Loosing $700 Billion a Year to IT Downtime, Says IHS I IHS Online Newsroom," Jan. 25, 2016, 4 pages.

Mashitzadeh, A., et al., "Towards Practical Default-On Multi-Core Record/Replay," Proceedings of the Twenty-Second International Conference on Architectural Support for Programming Languages and Operating Systems, Apr. 8-12, 2017, 16 pages.

Netzer, R., et al., "Improving the Accuracy of Data Race Detection," Proceedings of the third ACM SIGPLAN symposium on Principles and practice of parallel programming, Apr. 21-24, 1991, pp. 133-144.

"VirtualBox—Oracle VM VirtualBox," Mar. 5, 2018, 1 page.

Pelley, S., et al., "Memory Persistency," Proceeding of the 41st annual international symposium on Computer architecuture, Jun. 14-18, 2014, pp. 265-276.

Rubio-Gonzalez, C., et al., "Error Propagation Analysis for File Systems," Proceedings of the 30th ACM SIGPLAN Conference on Programming Language Design and Implementation, Jun. 15-20, 2009, 11 pages.

Saha, S., et al., "Hector: Detecting Resource-Release Omission Faults in Error-Handling Code for Systems Software," 43rd Annual IEEE/IFIP International Conference on Dependable Systems and Networks, Jun. 24-27, 2013, 12 pages.

Savage, S., et al., "Eraser: A Dynamic Data Race Detector for Multithreaded Programs," ACM Transactions on Computer Systems, vol. 15, No. 4, Nov. 1997, pp. 391-411.

Simsa, J., et al., "dBug: Systematic Evaluation of Distributed Systems," Proceedings of the 5th international conference on Systems software verification, Oct. 6-7, 2010, 9 pages.

Tian, C., et al., "Dynamic Recognition of Synchronization Operations for Improved Data Race Detection," Proceedings of the 2008 international symposium on Software testing and analysis, Jul. 20-24, 2008, 11 pages.

Volos, H., et al., "Mnemosyne: Lightweight Persistent Memory," Proceedings of the sixteenth international conference on Architectural support for programming languages and operating systems, Mar. 5-11, 2011, 13 pages.

Wilcox, J., et al., "Verdi: A Framework for Implementing and Formally Verifying Distributed Systems," Proceedings of the 36th ACM SIGPLAN Conference on Programming Language Design and Implementation, Jun. 13-17, 2015, pp. 357-368.

Xiong, W., et al., "Ad Hoc Synchronization Considered Harmful," Proceedings of the 9th Usenix conference on Operating systems design and implementation, Oct. 4-6, 2010, 14 pages.

Yang, J., "EXplode: a Lightweight, General System for Finding Serious Storage System Errors," Proceedings of the 7th Usenix Symposium on Operating Systems Design and Implementation, vol. 7, Nov. 6-8, 2006, 16 pages.

Yang, J., et al., "Using Model Checking to Find Serious File System Errors," 6th Symposium on Operating Systems Design and Implementation, vol. 24, No. 4, Nov. 2006, pp. 273-287.

Yuan, D., et al., "Simple Testing Can Prevent Most Critical Failures: An Analysis of Production Failures in Distributed Data-intensive Systems," 11th Usenix Symposium on Operating Systems Design and Implementation, Oct. 6-8, 2014, pp. 249-265.

Zheng, M., et al., "Tourturing Databases for Fun and Profit," Proceedings of the 11th Usenix Symposium on Operating Systems Design and Implementation, Oct. 6-8, 2014, pp. 449-464.

"FCatch: Automatically detecting time-of-fault bugs in cloud systems," ASPLOS Submission #376, 2018, 14 pages.

Office Action dated Oct. 18, 2019, 19 pages, U.S. Appl. No. 15/938,841, filed Mar. 28, 2018.

\* cited by examiner

MODEL CHECKER FOR FINDING DISTRIBUTED CONCURRENCY BUGS

TECHNICAL FIELD

The disclosure is related to the technical field of distributed computing, in particular detection of distributed concurrency bugs in a distributed computing system.

BACKGROUND

Cloud computing systems such as distributed computing frameworks, storage systems, lock services, and cluster managers are the backbone engines of many software based applications. Cloud computing systems typically include many nodes physically distributed and connected via a network, e.g., the Internet. The nodes store, manage, and process data. Groups of nodes are often referred to as clusters. The complexities and intricacies of the cloud computing systems make them difficult to manage. One issue is the problem of distributed concurrency (DC) bugs which are caused by concurrent distributed events occurring in a nondeterministic order. DC bugs can cause harmful consequences in cloud computing systems including system crashes, failed jobs, node/cluster unavailability, data loss, and data inconsistency. For example, a cloud computing system is configured to transmit messages A, B, and C to or from one of nodes 1, 2, and 3. The messages are transmitted in response to completion of a task or operation at the node that transmits the message. When node 2 receives message A, node 3 receives message B, and then node 2 receives message C from node 3, the system functions as expected. When the ordering of the messages is changed, e.g., node 3 receives message B and then transmits message C to node 2 prior to node 2 receiving message A from node 1, a failure will happen at node 2. A DC bug has occurred by changing the order of the messages received at node 2.

SUMMARY

In an embodiment, the disclosure includes a method for distributed concurrency (DC) bug detection. The method includes identifying, by a computing device, a plurality of nodes in a distributed computing cluster; identifying, by the computing device, a plurality of messages to be transmitted during execution of an application by the distributed computing cluster; determining, by the computing device, a set of orderings of the plurality of messages for DC bug detection, the set of orderings determined based upon the plurality of nodes and the plurality of messages; removing, by the computing device, a subset of the orderings from the set of orderings based upon one or more of a state symmetry algorithm, a disjoint-update independence algorithm, or a zero-crash-impact reordering algorithm; and performing, by the computing device, DC bug detection testing using the set of orderings after the subset of the orderings is removed from the set of orderings.

Optionally, in any of the preceding aspects, removing the subset of the orders from the set of orderings based upon the state symmetry algorithm comprises includes comparing a first state transition of a first node of a first ordering of the set of orderings with a second state transition of a second node of a second ordering of the set of orderings; and adding the second ordering to the subset of the orderings when the first state transition and the second state transition are symmetrical.

Optionally, in any of the preceding aspects, removing the subset of the orders from the set of orderings based upon the disjoint-update independence algorithm includes comparing a first variable in a first message of a first ordering of the set of orderings with a second variable in a second message of the first ordering of the set of orderings; and adding a second ordering to the subset of the orderings when the first variable and the second variable are different and the second ordering comprises the first message and the second message.

Optionally, in any of the preceding aspects, the method further includes determining, prior to performing the DC bug detection, one or more parallel flip orderings, each of the parallel flip orderings comprising a first plurality of messages for a first node and a second plurality of messages for a second node, wherein the first plurality of messages are independent of the second plurality of messages, and wherein the first plurality of messages and the second plurality of messages are reordered in each of the parallel flip orderings; and prioritizing the parallel flip orderings when performing the DC bug detection.

Optionally, in any of the preceding aspects, the zero-crash-impact reordering algorithm includes a crash-after-discard reduction or a consecutive-crash reduction.

Optionally, in any of the preceding aspects, removing the subset of the orders from the set of orderings based upon crash-after-discard reduction includes determining a first message of a first ordering will be discarded by a node; determining a second message of the first ordering causes a crash of the node; and adding a second ordering comprising the first message and the second message to the subset of the orderings.

Optionally, in any of the preceding aspects, removing the subset of the orders from the set of orderings based upon consecutive-crash reduction includes determining a first message of a first ordering causes a crash of a node; determining a second message of the first ordering causes another crash of the node; and adding a second ordering comprising the first message and the second message to the subset of the orderings.

Optionally, in any of the preceding aspects, the set of orderings includes unique orderings for each permutation of the plurality of messages received at each of the plurality of nodes.

Optionally, in any of the preceding aspects, the method further includes determining the subset of the orderings based upon each of the state symmetry algorithm, the disjoint-update independence algorithm, the zero-crash-impact reordering algorithm, and a parallel flips algorithm.

In an embodiment, the disclosure includes a device. The device includes a memory storage comprising instructions; and a processor in communication with the memory. The processor executes the instructions to identify a plurality of nodes in a distributed computing cluster; identify a plurality of messages to be transmitted during execution of an application by the distributed computing cluster; determine a set of orderings of the plurality of messages for distributed concurrency (DC) bug detection, the set of orderings determined based upon the plurality of nodes and the plurality of messages; remove a subset of the orderings from the set of orderings based upon one or more of a state symmetry algorithm, a disjoint-update independence algorithm, or a zero-crash-impact reordering algorithm; and perform DC bug detection testing using the set of orderings after the subset of the orderings is removed from the set of order.

Optionally, in any of the preceding aspects, the instructions to remove the subset of the orders from the set of orderings based upon the state symmetry algorithm include instructions to compare a first state transition of a first node of a first ordering of the set of orderings with a second state transition of a second node of a second ordering of the set of orderings; and add the second ordering to the subset of the orderings when the first state transition and the second state transition are symmetrical.

Optionally, in any of the preceding aspects, the instructions to remove the subset of the orders from the set of orderings based upon the disjoint-update independence algorithm include instructions to compare a first variable in a first message of a first ordering of the set of orderings with a second variable in a second message of the first ordering of the set of orderings, and add a second ordering to the subset of the orderings when the first variable and the second variable are different and the second ordering comprises the first message and the second message.

Optionally, in any of the preceding aspects, the processor further executes the instructions to determine, prior to performing the DC bug detection, one or more parallel flip orderings, each of the parallel flip orderings comprising a first plurality of messages for a first node and a second plurality of messages for a second node, wherein the first plurality of messages are independent of the second plurality of messages, and wherein the first plurality of messages and the second plurality of messages are reordered in each of the parallel flip orderings, and prioritize the parallel flip orderings when performing the Dc bug detection.

Optionally, in any of the preceding aspects, the zero-crash-impact reordering algorithm includes a crash-after-discard reduction or a consecutive-crash reduction.

Optionally, in any of the preceding aspects, instructions to remove the subset of the orders from the set of orderings based upon the crash-after-discard reduction include instructions to determine a first message of a first ordering will be discarded by a node, determine a second message of the first ordering causes a crash of the node, and add a second ordering comprising the first message and the second message to the subset of the orderings.

Optionally, in any of the preceding aspects, instructions to remove the subset of the orders from the set of orderings based upon the consecutive-crash reduction includes instructions to determine a first message of a first ordering causes a crash of a node, determine a second message of the first ordering causes another crash of the node, and add a second ordering comprising the first message and the second message to the subset of the orderings.

Optionally, in any of the preceding aspects, the set of orderings includes unique orderings for each permutation of the plurality of messages received at each of the plurality of nodes.

Optionally, in any of the preceding aspects, the processor further executes the instructions to determine the subset of the orderings based upon each of the state symmetry algorithm, the disjoint-update independence algorithm, the zero-crash-impact reordering algorithm, and a parallel flips algorithm.

In an embodiment, the disclosure includes a non-transitory computer readable medium storing computer instructions, that when executed by a processor, causes the processor to perform identify a plurality of nodes in a distributed computing cluster; identify a plurality of messages to be transmitted during execution of an application by the distributed computing cluster; determine a set of orderings of the plurality of messages for distributed concurrency (DC) bug detection; remove a subset of the orderings from the set of orderings based upon one or more of a state symmetry algorithm, a disjoint-update independence algorithm, or a zero-crash-impact reordering algorithm; and perform DC bug detection testing using the set of orderings after the subset of the orderings is removed from the set of orderings.

Optionally, in any of the preceding aspects, the instructions that cause the processor to remove the subset of the orders from the set of orderings based upon the state symmetry algorithm include instructions that cause the processor to compare a first state transition of a first node of a first ordering of the set of orderings with a second state transition of a second node of a second ordering of the set of orderings, and add the second ordering to the subset of the orderings when the first state transition and the second state transition are symmetrical.

Optionally, in any of the preceding aspects, the instructions that cause the processor to remove the subset of the orders from the set of orderings based upon the disjoint-update independence algorithm include instructions that cause the processor to compare a first variable in a first message of a first ordering of the set of orderings with a second variable in a second message of the first ordering of the set of orderings, and add a second ordering to the subset of the orderings when the first variable and the second variable are different and the second ordering comprises the first message and the second message.

Optionally, in any of the preceding aspects, the instructions further cause the processor to determine, prior to the DC bug detection, one or more parallel flip orderings, each of the parallel flip orderings comprising a first plurality of messages for a first node and a second plurality of messages for a second node, wherein the first plurality of messages are independent of the second plurality of messages, and wherein the first plurality of messages and the second plurality of messages are reordered in each of the parallel flip orderings, and prioritize the parallel flip orderings when performing the DC bug detection.

Optionally, in any of the preceding aspects, the zero-crash-impact reordering algorithm is a crash-after-discard reduction or a consecutive-crash reduction.

Optionally, in any of the preceding aspects, the instructions that cause the processor to remove the subset of the orders from the set of orderings based upon the crash-after-discard reduction include instructions that cause the processor to determine a first message of a first ordering will be discarded by a node, determine a second message of the first ordering causes a crash of the node, and add a second ordering comprising the first message and the second message to the subset of the orderings.

Optionally, in any of the preceding aspects, the instructions that cause the processor to remove the subset of the orders from the set of orderings based upon the consecutive-crash reduction include instructions that cause the processor to determine a first message of a first ordering causes a crash of a node, determine a second message of the first ordering causes another crash of the node, and add a second ordering comprising the first message and the second message to the subset of the orderings.

Optionally, in any of the preceding aspects, the set of orderings includes unique orderings for each permutation of the plurality of messages received at each of the plurality of nodes.

Optionally, in any of the preceding aspects, the instructions further cause the processor to determine the subset of the orderings based upon each of the state symmetry algorithm, the disjoint-update independence algorithm, the zero-crash-impact reordering algorithm, and a parallel flips algorithm.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
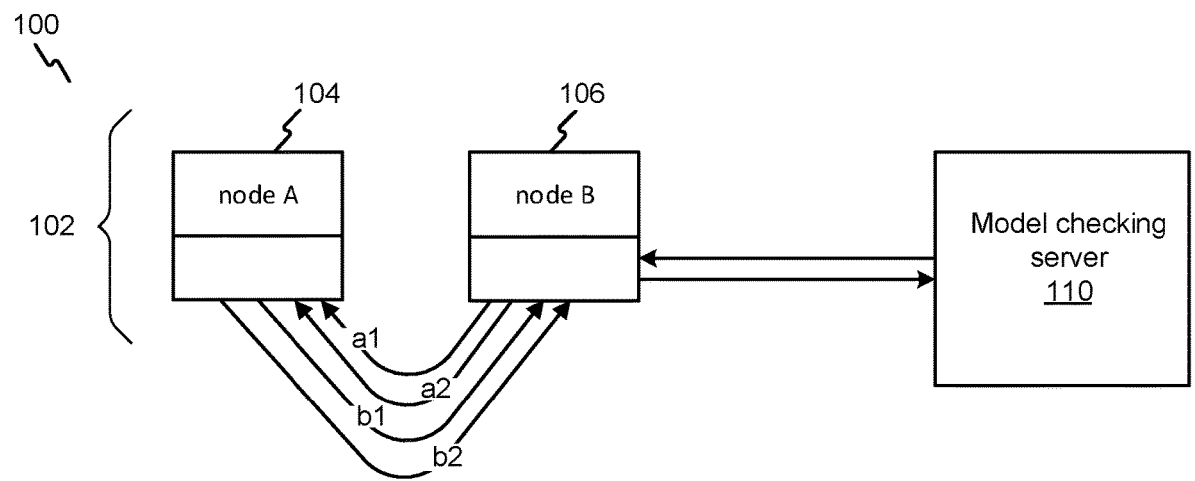
FIG. 1 is a diagram of an embodiment of DC bug detection architecture.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Cloud computing involves performing operations across a network of nodes. The operations may be performed responsive to execution of a software application (or "application"). As used herein, an application includes instructions or operations that will be executed in a cloud based system. Cloud based systems include nodes physically distributed and connected via a network, e.g., the Internet. The nodes of a cloud based system can store, manage, and process data. The data storage, management, and processing capabilities of the nodes of the cloud based system can be shared to perform computing tasks. Instructions or operations of an application executed by a cloud based system may distributed across one or more of the nodes. Cloud based systems include distributed computing frameworks, storage systems, lock services, and cluster managers. When an operation is executed, the state of the node that executes the operation may change. A change in state of the node may occur based upon the operation performed or the current state of the node. In some cases, an operation may not cause the state of the node to change. Other nodes may or may not be aware of the current state of the node that executed the operation. The node that executed the operations may send a message comprising a command or data to a second node. Messages include instructions or operations sent from one node of the cloud based system to another node of the cloud based system. For example, messages can include instructions to update a variable, perform a calculation, or display a variable. Sometimes the second node may crash or experience other performance issues if the message from the node that executed the operation is incompatible with the current state of the second node. As used herein distributed concurrency (DC) bugs may refer to an error resulting from the order and timing transmission and receipt of messages, between two or more nodes in a cloud computing system.

Embodiments of the present disclosure are directed to methods, systems, and apparatuses for detecting DC bugs in a cloud computing system. In an embodiment, a distributed system model checker may implement algorithms for improving the ability to detect DC bugs. In some embodiments, the algorithms may reduce the search space of testing the permutations of message ordering in a cloud based system. A message ordering includes a time ordered sequence of messages arriving at one or more nodes during execution of an application. Permutations of message orderings includes several message orderings with a varied time sequence of arrival of the messages in each permutation. In some embodiments, the algorithms may prioritize certain permutations to decrease the time required for testing. The algorithms may include a state symmetry algorithm, a disjoint-update independence algorithm, a parallel flips algorithm, and/or a zero-crash-impact reordering algorithm, each of which are described in greater detail herein.

FIG. 1 is a diagram of an embodiment of DC bug detection architecture 100. The DC bug detection architecture 100 includes a model checking server 110, node A 104, and node B 106. In other embodiments, more than two nodes may be present in the architecture. The number of nodes depends upon the characteristics of the cloud based system where the application under test is executed. Node A 104 and node B 106 are be grouped as a cluster 102. By way of illustration, cluster 102 executes an application under test wherein the application can send several messages: a1, a2, b1, and b2. While four messages are depicted in this illustration, an application under test may transmit and receive many more messages depending upon the functionality of the application. The number of permutations of messages may be equal to the number of messages factorial. In this illustration, the number of permutations of messages is four factorial or twenty-four possible permutations. The model checking server 110 may enable the messages in each of the possible permutations and monitor the results of the various permutations of messages. Enabling a message may include the model checking server 110 sending a message or the model checking server 110 causing a node to send a message. The model checking server 110 tracks permutations that have been executed and permutations that are to-be executed. A permutation is considered executed after all of the messages in the permutation have been sent, i.e., enabled, according to the message ordering in the permutation. For permutations that have been executed, the model checking server 110 tracks whether or not there was an error in relation to that particular permutation of messages. While the model checking server 110 is depicted as communicating with node B 106, model checking server 110 can communicate with all or some of the nodes under test in a distributed computing environment. In some embodiments, algorithms are used to determine that certain permutations need not to be tested. Those algorithms will be discussed in detail below.

Figure 2:
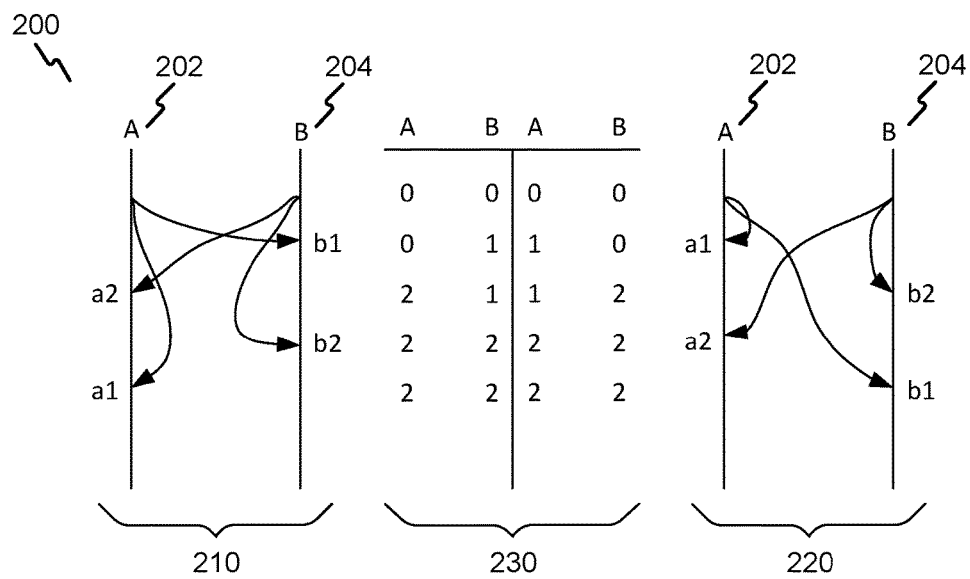
FIG. 2 is a diagram of an embodiment of permutations used in state symmetry reductions.

In some embodiments, a state symmetry algorithm can be executed to reduce the number of permutations that need to be tested. The state symmetry algorithm can identify pairs of permutations that result in symmetrical state transitions. For pairs of permutations with symmetrical state transitions, only one of the permutations may need to be tested. FIG. 2 is a diagram of an embodiment of a permutations 200 used in state symmetry reductions. By way of illustration, FIG. 2 represents the first phases of a leader election implementation with two concurrent updates from node A 202 and node B 204. While the state symmetry algorithm can be used with other distributed computing protocols, leader election is used here as an example to illustrate the state symmetry algorithm. Leader election is a process of designating a node or process as the organizer of a task distributed among multiple nodes, in this case, node A 202 and node B 204. Node A 202 broadcasts 'prepare' messages a1 and b1 while node B 204 broadcasts 'prepare' messages a2 and b2. The messages arrive at their destinations at different times based on a number of factors, e.g., network configuration and/or network loading. Message flow 210 represents a first permutation of message arrivals and message flow 220 represents a second permutation of message arrivals. Table 230 depicts the state of each node after a message is received, e.g., state transition of the nodes when messages are received. The left column of table 230 corresponds to message flow 210 and the right column of table 230 corresponds to message flow 220. Message flow 210 receives messages at their respective destinations in the following order: b1, a2, b2, a1. Message flow 220 receives messages at their respective destinations in the following order: a1, b2, a2, b1. The messages may include a ballot number in this example. In the context of leader election, a ballot number is an identifier for a round of a leader election. Outside the context of leader election, a ballot number can be an identifier for a particular process to be distributed in a consensus. Messages with a '1', e.g., a1, b1, can represent a ballot number of 1. Messages with a '2' e.g., a2, b2, can represent a ballot number of 2. Each row of table 230 represents a particular time and the states of the nodes with respect to receipt messages a1, a2, b1, and b2 at that time. The first row represents an initial state where both nodes are all zeroes. At the second row, message flow 210 receives message b1 at node B 204 and the state on the left column of table 230 is set to zero for node A 202 and one for node B 204. Also at the second row, message flow 220 receives message a1 at node A 202 and the state on the right column of table 230 is set to one for node A 202 and zero for node B 204. At the completion of message flow 210 and message flow 220, the state changes tracked in table 230 of node A 202 with respect to message flow 210 are the same as the state changes tracked in table 230 of node B 204 for message flow 220. Likewise, the state changes tracked in table 230 of node B 204 with respect to message flow 210 are the same as the state changes of node A 202 with respect to message flow 220. Thus, the results are considered to have symmetry and one of the permutations can be omitted from testing in a leader election process. By identifying which permutations result in state symmetry, the identified permutations can be eliminated from testing and the test time will be reduced thusly.

Figure 3:
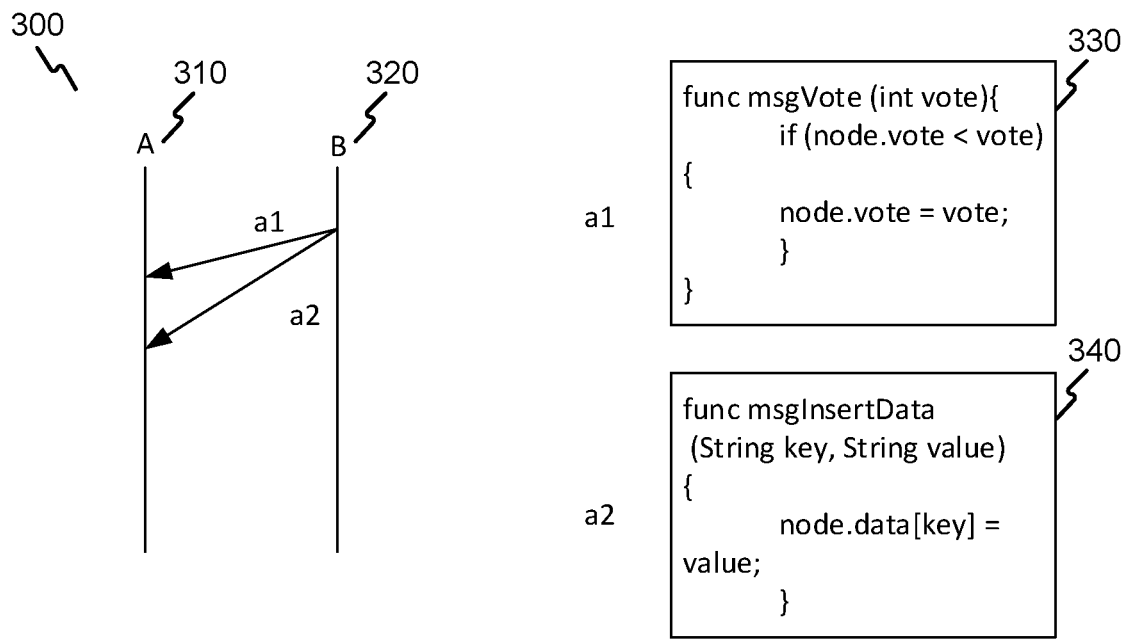
FIG. 3 is a diagram of an embodiment of disjoint-update independence.

In further embodiments, a disjoint-update independence algorithm can be utilized to reduce the number of permutations that need to be tested. The disjoint-update independence algorithm detects permutations with messages that update different variables. If the messages update different variables, then testing both permutations may be unnecessary. FIG. 3 is a diagram of an embodiment of disjoint-update independence 300. Node B 320 concurrently transmits messages a1 and a2 to node A 310. Message content 330 of message a1 can include a read and write of the 'vote' variable, for example. Message content 340 of message a2 can include a write of the 'key' variable, for example. The variable updated by message a1 is different than the variable updated by message a2. When messages update unrelated variables, a disjoint-update can occur. When different variables are updated by two messages, the order of arrival of the messages at the node may not be relevant to the final state of the node. For example, the value of 'vote' at node A 310 will have the same final value whether message a1 is received first or message a2 is received first. Likewise, the value of variable 'key' at node A 310 will have the same final value whether message a1 is received first or message a2 is received first. In this case, message ordering a1, a2 and a2, a1 result in a same final state of node A 310, thus one of the orderings may be discarded.

Disjoint-update independence 300 can be further described in light of the following. For messages ni and nj sent to a node N, a static analysis can be used to build live variable sets: readSet, updateSet and persistSet. The static analysis includes identifying variables in the messages of two or more permutations. The readSet includes to-be-read variables in the messages, i.e., variables that will be read when a message is transmitted. The updateSet includes to-be-updated variables in the messages, i.e., variables that will be read when a message is transmitted. The persistSet includes to-be-persisted variables, i.e., variables that will be unchanged when a message is transmitted. The live variable sets reflect changes in ni's and nj's read, update, and send sets as node N transitions to a different state after receiving message ni or nj. Given such information, ni and nj are marked disjoint-update independent if ni's readSet, updateSet, and persistSet do not overlap with nj's updateSet, and vice versa. I.e., nj's udateSet does not reflect an update to any of ni's live variable sets, and vice versa. Thus, the ordering of message ni and nj may have the same result as reordering nj and ni, and one of the orderings may be skipped during testing.

Figure 4:
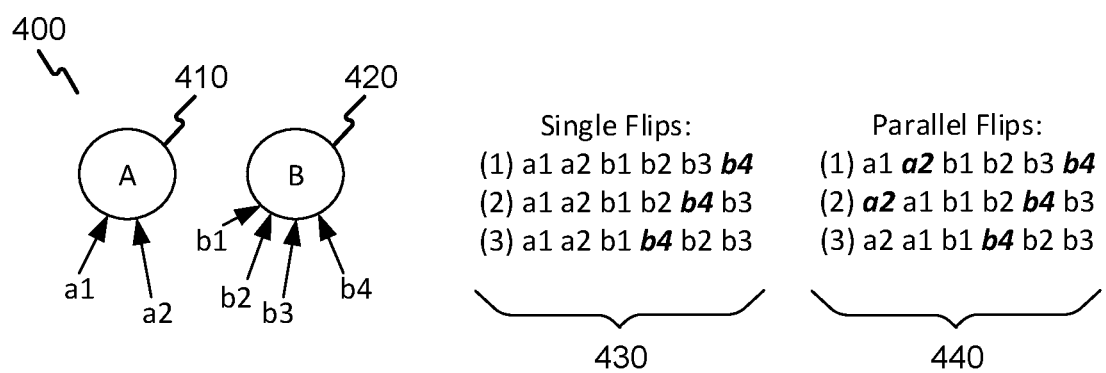
FIG. 4 is a diagram of an embodiment of parallel flips testing.

In further embodiments, a parallel flips algorithm can be used to speed up testing relative to existing model checking systems. The parallel flips algorithm includes identifying independent messages in a permutation involving at least two nodes. The independent messages may be flipped, e.g., reordered, in parallel for the two or more nodes in a single permutation. FIG. 4 is a diagram of an embodiment of parallel flips testing example test 400. In this example, node A 410 receives messages a1 and a2, and node B 420 receives messages b1, b2, b3, and b4. Single flip orderings 430 represent a portion of the permutations tested in single flip testing of node A 410 and node B 420 with respect to messages a1, a2, b1, b2, b3, and b4. Parallel flip orderings 440 represent a portion of the permutations tested in parallel flip testing of node A 410 and node B 420 with respect to messages a1, a2, b1, b2, b3, and b4. As shown, only one message, b4, is flipped (e.g., reordered) from permutation (1) to permutation (2) in single flips orderings 430. For parallel flips, two messages, b4 and a2, are flipped (e.g., reordered) from permutation (1) to permutation (2) in parallel flips orderings 440. Parallel flips algorithm can speed up testing by flipping pairs of messages that are independent of each other. For example, message a2 arrives at node A 410 and is independent of message b4 which arrives at node B 420. Therefore, the messages can be flipped in parallel rather than one at a time, thereby speeding up the testing of the nodes. Parallel flips orderings can be prioritized over single flips orderings in order to more quickly test the messages. For example, a parallel flip ordering tests two messages arrival at two nodes simultaneously. The same testing using single flips may require at least two testing cycles. In some embodiments, orderings with a single flip that is tested using a parallel flip may be skipped during testing.

A zero-crash-impact reduction algorithm may be executed to reduce the number of permutations that need to be tested. The zero-crash impact reduction algorithm identifies permutations that result in a crash and removes permutations that include the crash from further testing. Zero-crash-impact reduction includes two cases where certain reorderings that cause a node to crash may be discarded from testing. The two cases may include crash-after-discard reduction and consecutive-crash reduction. Crash-after-discard reduction may include cases where 'mx' is a reordering. Message 'm' may be discarded after received by the node, e.g., message 'm' may not change the state of the node where it is received before being discarded. Message 'x' may be a message that causes a crash on the same node. Reordering is unnecessary as 'm' does not create any state change and 'x' always causes a crash. Hence the reordering 'mx' may be removed. Consecutive-crash reduction may include cases where 'xy' is a reordering, where message 'x' and message 'y' are both crashes. In this case reordering is unnecessary as two consecutive crashes are equivalent to one in terms of system state. Hence reordering 'xy' may be removed from testing.

Figure 5:
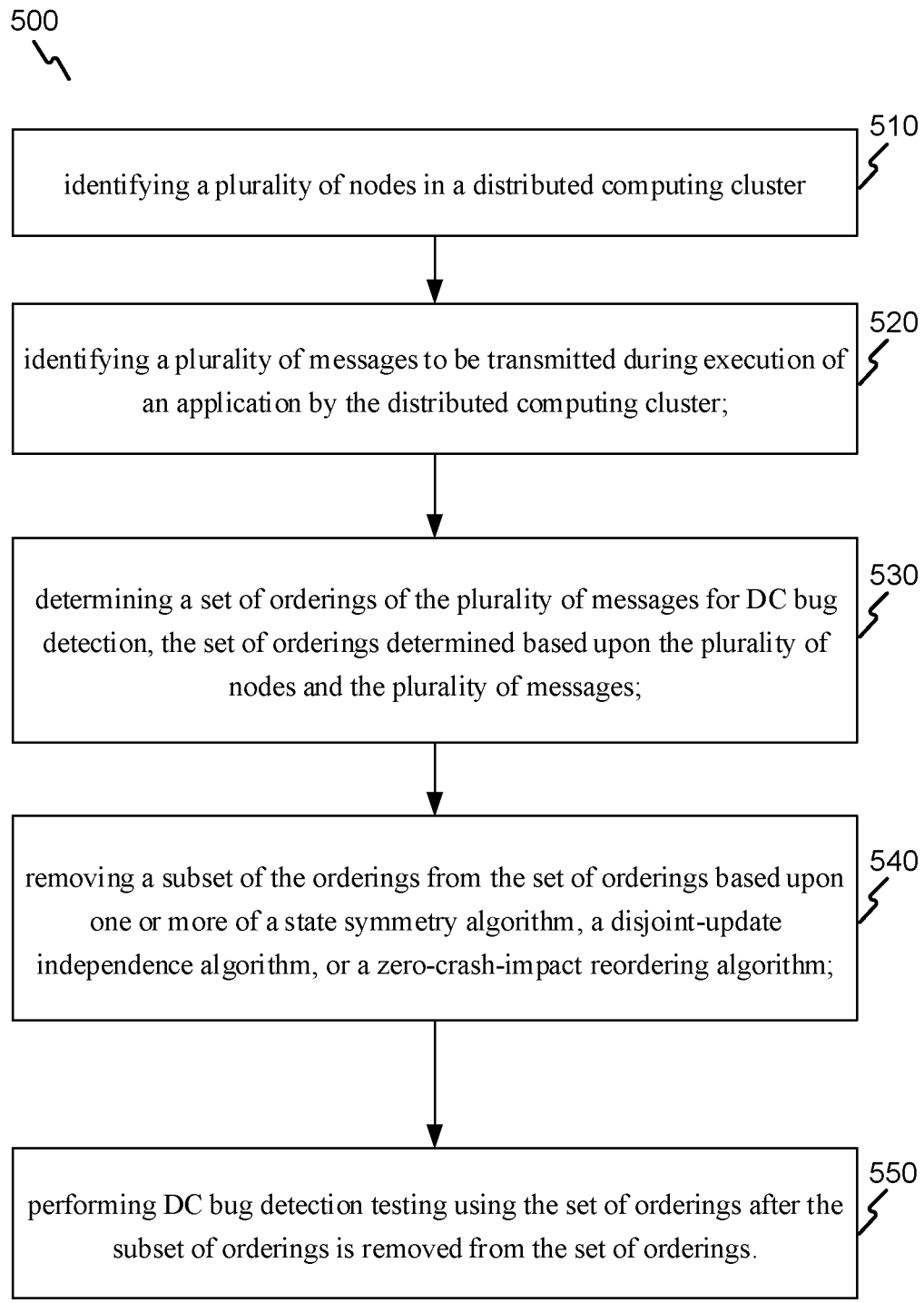
FIG. 5 is a diagram of an embodiment of a method for DC bug detection.

FIG. 5 is a diagram of an embodiment of a method 500 for DC bug detection. The method 500 begins at block 510 where a model checking server identifies a plurality of nodes in a distributed computing cluster. The plurality of nodes can be identified using one or more of a number of network discovery techniques. For example, a listing of the nodes can be programmed into the model checking server and/or the model checking server can interact with a networking device to learn the topology of the distributed computing cluster.

At block 520, the model checking server identifies a plurality of messages that result from execution of an application by the distributed computing cluster. For example, an application comprises a number of operations that can be performed at one or more of the nodes in the distributed computing cluster. The operations can provide data to other nodes in order to perform a subsequent operation of the application. The data can be provided in messages that are transmitted between nodes.

At block 530, the model checking server determines a set of orderings of the plurality of messages for use in DC bug detection. An ordering may be an arrival sequence of the messages of the application at one or more nodes, i.e., a permutation of messages. Each ordering can be a unique sequence of message arrival at one or more of the nodes of the distributed computing cluster. The set of orderings can include all possible sequences of message arrival for each of the plurality of nodes in the distributed computing cluster. By testing all sequences, DC bugs can be detected for sequences that cause performance issues in the distributed computing cluster, e.g., degraded performance and/or node crashes.

At block 540, the model checking server removes a subset of the orderings from the set of orderings based upon one or more of a state symmetry algorithm, a disjoint-update independence algorithm, or a zero-crash-impact reordering algorithm. The model checking server executes one or more of the algorithms in order to reduce the number of orderings that need to be tested for DC bug detection. Removing some of the orderings from the set of orderings reduces the testing time required for DC bug detection. As described above, the algorithms can determine orderings that are redundant and don't need to be tested. Optionally at block 540, the model checking server may execute a parallel flips algorithm to prioritize certain orderings during testing. By prioritizing parallel flip orderings, testing time may be reduced.

At block 550, the model checking server performs DC bug detection testing using the set of orderings after the subset of the orderings is removed from the set of orderings. When the set of orderings has been optimized by removing the orderings identified by the algorithms, the testing can be performed with increased efficiency.

Figure 6:
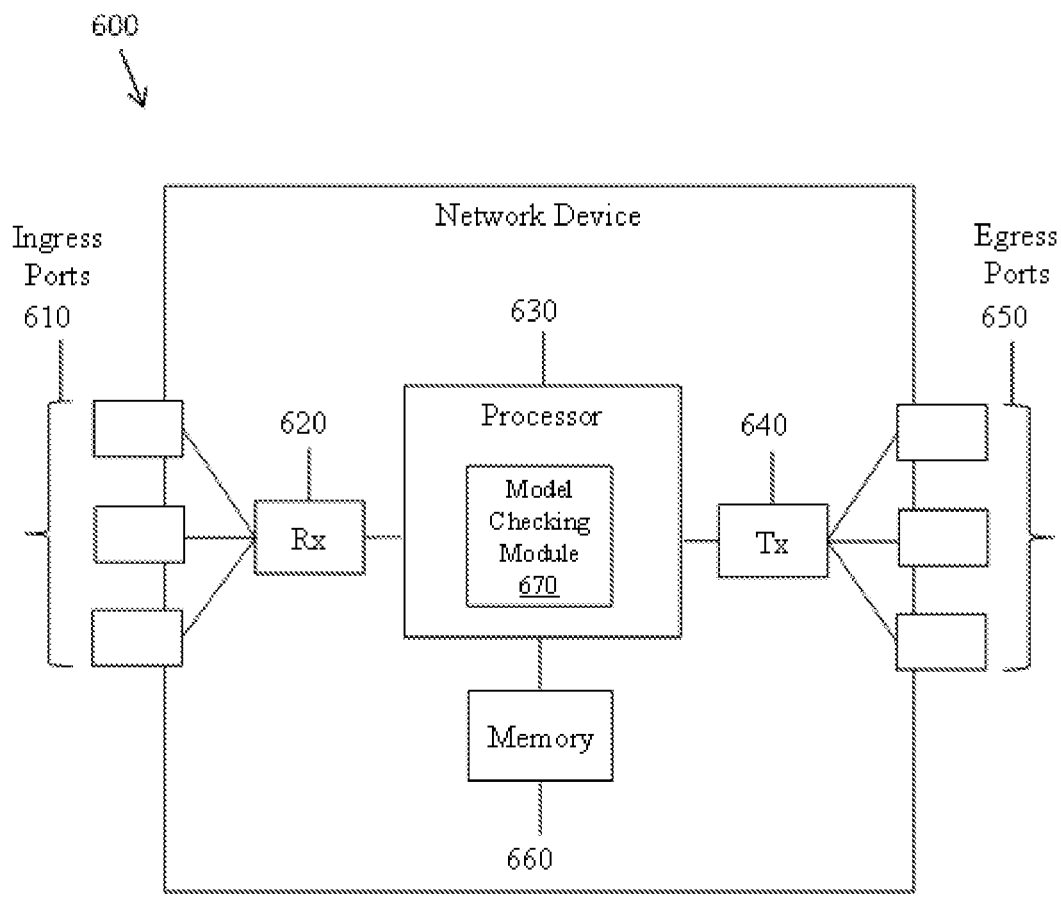
FIG. 6 is a schematic diagram of a network device according to an embodiment of the disclosure.

FIG. 6 is a schematic diagram of a network device 600 (e.g., a model checking server) according to an embodiment of the disclosure. The network device 600 is suitable for implementing the disclosed embodiments as described herein. In an embodiment, the network device 600 is a model checking server. The network device 600 comprises ingress ports 610 and receiver units (Rx) 620 for receiving data; a processor, logic unit, or central processing unit (CPU) 630 to process the data; transmitter units (Tx) 640 and egress ports 650 for transmitting the data; and a memory 660 for storing the data. The network device 600 may also comprise optical-to-electrical (OE) components and electrical-to-optical (EO) components coupled to the ingress ports 610, the receiver units 620, the transmitter units 640, and the egress ports 650 for egress or ingress of optical or electrical signals.

The processor 630 can be implemented by hardware and/or software. The processor 630 can be implemented as one or more CPU chips, cores (e.g., as a multi-core processor), field-programmable gate arrays (FPGAs), application specific integrated circuits (ASICs), and digital signal processors (DSPs). The processor 630 is in communication with the ingress ports 610, receiver units 620, transmitter units 640, egress ports 650, and memory 660. The processor 630 comprises a model checking module 670. The model checking module 670 implements the disclosed embodiments described above. For instance, the model checking module 670 implements, processes, prepares, or provides the various algorithms described herein. The inclusion of the model checking module 670 therefore provides a substantial improvement to the functionality of the network device 600 and effects a transformation of the network device 600 to a different state. Alternatively, the model checking module 670 is implemented as instructions stored in the memory 660 and executed by the processor 630.

The memory 660 comprises one or more disks, tape drives, and solid-state drives and can be used as an over-flow data storage device, to store programs when such programs are selected for execution, and to store instructions and data that are read during program execution. The memory 660 can be volatile and/or non-volatile and can be read-only memory (ROM), random access memory (RAM), ternary content-addressable memory (TCAM), and/or static random-access memory (SRAM).

A method for distributed concurrency (DC) bug detection including means for identifying a plurality of nodes in a distributed computing cluster; identifying a plurality of messages to be transmitted during execution of an application by the distributed computing cluster; determining a set of orderings of the plurality of messages for DC bug detection, the set of orderings determined based upon the plurality of nodes and the plurality of messages; removing a subset of the orderings from the set of orderings based upon one or more of a state symmetry algorithm, a disjoint-update independence algorithm, or a zero-crash-impact reordering algorithm; and performing DC bug detection testing using the set of orderings after the subset of the orderings is removed from the set of orderings.

A memory storage means comprising instructions; and a processor means in communication with the memory means.

The processor means executes the instructions to identify a plurality of nodes in a distributed computing cluster; identify a plurality of messages to be transmitted during execution of an application by the distributed computing cluster; determine a set of orderings of the plurality of messages for distributed concurrency (DC) bug detection, the set of orderings determined based upon the plurality of nodes and the plurality of messages; remove a subset of the orderings from the set of orderings based upon one or more of a state symmetry algorithm, a disjoint-update independence algorithm, or a zero-crash-impact reordering algorithm; and perform DC bug detection testing using the set of orderings after the subset of the orderings is removed from the set of order.

A non-transitory computer readable medium means storing computer instructions, that when executed by a processor means, causes the processor means to perform identify a plurality of nodes in a distributed computing cluster; identify a plurality of messages to be transmitted during execution of an application by the distributed computing cluster; determine a set of orderings of the plurality of messages for distributed concurrency (DC) bug detection; remove a subset of the orderings from the set of orderings based upon one or more of a state symmetry algorithm, a disjoint-update independence algorithm, or a zero-crash-impact reordering algorithm; and perform DC bug detection testing using the set of orderings after the subset of the orderings is removed from the set of orderings.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components can be combined or integrated in another system or certain features can be omitted, or not implemented.

In addition, techniques, systems, subsystems, and methods described and illustrated in the various embodiments as discrete or separate can be combined or integrated with other systems, modules, techniques, or methods without departing from the scope of the present disclosure. Other items shown or discussed as coupled can be directly coupled or can be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for distributed concurrency (DC) bug detection, the method comprising:
   identifying, by a computing device, a plurality of nodes in a distributed computing cluster;
   identifying, by the computing device, a plurality of messages to be transmitted during execution of an application by the distributed computing cluster;
   determining, by the computing device, a set of orderings of the plurality of messages for DC bug detection, the set of orderings determined based upon the plurality of nodes and the plurality of messages;
   removing, by the computing device, a subset of the orderings, where each ordering comprises a unique sequence of message arrival at one or more of the nodes, from the set of orderings based upon one or more of a state symmetry algorithm, a disjoint-update independence algorithm, and a zero-crash-impact reordering algorithm, where the zero-crash-impact reordering algorithm is a crash-after-discard reduction or a consecutive-crash reduction, and where the consecutive-crash reduction comprises determining a first message of a first ordering causes a crash of a node, determining a second message of the first ordering causes another crash of the node, and adding a second ordering comprising the first message and the second message to the subset of the orderings; and
   performing, by the computing device, DC bug detection testing using the set of orderings after the subset of the orderings is removed from the set of orderings.

2. The method of claim 1, wherein removing the subset of the orders from the set of orderings based upon the state symmetry algorithm comprises:
   comparing a first state transition of a first node of a first ordering of the set of orderings with a second state transition of a second node of a second ordering of the set of orderings; and
   adding the second ordering to the subset of the orderings when the first state transition and the second state transition are symmetrical.

3. The method of claim 1, wherein removing the subset of the orders from the set of orderings based upon the disjoint-update independence algorithm comprises:
   comparing a first variable in a first message of a first ordering of the set of orderings with a second variable in a second message of the first ordering of the set of orderings; and
   adding a second ordering to the subset of the orderings when the first variable and the second variable are different and the second ordering comprises the first message and the second message.

4. The method of claim 1, further comprising:
   determining, prior to performing the DC bug detection, one or more parallel flip orderings, each of the parallel flip orderings comprising a first plurality of messages for a first node and a second plurality of messages for a second node, wherein the first plurality of messages are independent of the second plurality of messages, and wherein the first plurality of messages and the second plurality of messages are reordered in each of the parallel flip orderings; and
   prioritizing the parallel flip orderings when performing the DC bug detection.

5. The method of claim 1, wherein removing the subset of the orders from the set of orderings based upon crash-after-discard reduction comprises:
   determining a first message of a first ordering will be discarded by a node;
   determining a second message of the first ordering causes a crash of the node; and
   adding a second ordering comprising the first message and the second message to the subset of the orderings.

6. The method of claim 1, wherein the set of orderings comprises unique orderings for each permutation of the plurality of messages received at each of the plurality of nodes.

7. The method of claim 1, further comprising determining the subset of the orderings based upon each of the state symmetry algorithm, the disjoint-update independence algorithm, the zero-crash-impact reordering algorithm, and a parallel flips algorithm.

8. A device comprising:
   a memory storage comprising instructions; and a processor in communication with the memory, wherein
the processor executes the instructions to:
identify a plurality of nodes in a distributed computing cluster;
identify a plurality of messages to be transmitted during execution of an application by the distributed computing cluster;
determine a set of orderings of the plurality of messages for distributed concurrency (DC) bug detection, the set of orderings determined based upon the plurality of nodes and the plurality of messages;
remove a subset of the orderings, where each ordering comprises a unique sequence of message arrival at one or more of the nodes, from the set of orderings based upon one or more of a state symmetry algorithm, a disjoint-update independence algorithm, and a zero-crash-impact reordering algorithm, where the zero-crash-impact reordering algorithm is a crash-after-discard reduction or a consecutive-crash reduction, and where the consecutive-crash reduction comprises determining a first message of a first ordering causes a crash of a node, determining a second message of the first ordering causes another crash of the node, and adding a second ordering comprising the first message and the second message to the subset of the orderings; and
perform DC bug detection testing using the set of orderings after the subset of the orderings is removed from the set of orderings.

9. The device of claim 8, wherein the instructions to remove the subset of the orders from the set of orderings based upon the state symmetry algorithm comprise instructions to:
compare a first state transition of a first node of a first ordering of the set of orderings with a second state transition of a second node of a second ordering of the set of orderings; and
add the second ordering to the subset of the orderings when the first state transition and the second state transition are symmetrical.

10. The device of claim 8, wherein the instructions to remove the subset of the orders from the set of orderings based upon the disjoint-update independence algorithm comprise instructions to:
compare a first variable in a first message of a first ordering of the set of orderings with a second variable in a second message of the first ordering of the set of orderings; and
add a second ordering to the subset of the orderings when the first variable and the second variable are different and the second ordering comprises the first message and the second message.

11. The device of claim 8, wherein the processor further executes the instructions to:
determine, prior to performing the DC bug detection, one or more parallel flip orderings, each of the parallel flip orderings comprising a first plurality of messages for a first node and a second plurality of messages for a second node, wherein the first plurality of messages are independent of the second plurality of messages, and wherein the first plurality of messages and the second plurality of messages are reordered in each of the parallel flip orderings; and
prioritize the parallel flip orderings when performing the Dc bug detection.

12. The device of claim 8, wherein instructions to remove the subset of the orders from the set of orderings based upon the crash-after-discard reduction comprise instructions to:
determine a first message of a first ordering will be discarded by a node;
determine a second message of the first ordering causes a crash of the node; and
add a second ordering comprising the first message and the second message to the subset of the orderings.

13. The device of claim 8, wherein the set of orderings comprises unique orderings for each permutation of the plurality of messages received at each of the plurality of nodes.

14. The device of claim 8, wherein the processor is further configured to determine the subset of the orderings based upon each of the state symmetry algorithm, the disjoint-update independence algorithm, the zero-crash-impact reordering algorithm, and a parallel flips algorithm.

15. A non-transitory computer readable medium storing computer instructions, that when executed by a processor, causes the processor to perform:
identify a plurality of nodes in a distributed computing cluster;
identify a plurality of messages to be transmitted during execution of an application by the distributed computing cluster;
determine a set of orderings of the plurality of messages for distributed concurrency (DC) bug detection;
remove a subset of the orderings, where each ordering comprises a unique sequence of message arrival at one or more of the nodes, from the set of orderings based upon one or more of a state symmetry algorithm, a disjoint-update independence algorithm, and a zero-crash-impact reordering algorithm, where the zero-crash-impact reordering algorithm is a crash-after-discard reduction or a consecutive-crash reduction, and where the consecutive-crash reduction comprises determining a first message of a first ordering causes a crash of a node, determining a second message of the first ordering causes another crash of the node, and adding a second ordering comprising the first message and the second message to the subset of the orderings; and
perform DC bug detection testing using the set of orderings after the subset of the orderings is removed from the set of orderings.

16. The non-transitory computer readable medium of claim 15, wherein the instructions that cause the processor to remove the subset of the orders from the set of orderings based upon the state symmetry algorithm comprise instructions that cause the processor to perform:
compare a first state transition of a first node of a first ordering of the set of orderings with a second state transition of a second node of a second ordering of the set of orderings; and
add the second ordering to the subset of the orderings when the first state transition and the second state transition are symmetrical.

17. The non-transitory computer readable medium of claim 15, wherein the instructions that cause the processor to remove the subset of the orders from the set of orderings based upon the disjoint-update independence algorithm comprise instructions that cause the processor to perform:
compare a first variable in a first message of a first ordering of the set of orderings with a second variable in a second message of the first ordering of the set of orderings; and add a second ordering to the subset of the orderings when the first variable and the second variable are different and the second ordering comprises the first message and the second message.

18. The non-transitory computer readable medium of claim 15, wherein the instructions further cause the processor to perform:

determine, prior to the DC bug detection, one or more parallel flip orderings, each of the parallel flip orderings comprising a first plurality of messages for a first node and a second plurality of messages for a second node, wherein the first plurality of messages are independent of the second plurality of messages, and wherein the first plurality of messages and the second plurality of messages are reordered in each of the parallel flip orderings; and prioritize the parallel flip orderings when performing the DC bug detection.

19. The non-transitory computer readable medium of claim 15, wherein instructions that cause the processor to remove the subset of the orders from the set of orderings based upon the crash-after-discard reduction comprise instructions that cause the processor to perform:

determine a first message of a first ordering will be discarded by a node;

determine a second message of the first ordering causes a crash of the node; and add a second ordering comprising the first message and the second message to the subset of the orderings.

20. The non-transitory computer readable medium of claim 15, wherein the set of orderings comprises unique orderings for each permutation of the plurality of messages received at each of the plurality of nodes.

21. The non-transitory computer readable medium of claim 15, wherein the instructions further cause the processor to determine the subset of the orderings based upon each of the state symmetry algorithm, the disjoint-update independence algorithm, the zero-crash-impact reordering algorithm, and a parallel flips algorithm.

* * * * *